United States Patent
Hamphoff et al.

[19]

[11] Patent Number: 5,899,825
[45] Date of Patent: May 4, 1999

[54] DRIVE SYSTEM FOR "CATERPILLAR" VEHICLE

[75] Inventors: Berthold Hamphoff, Beelen; Andreas Dicks, Harsewinkel, both of Germany; Staurt Mackay, Norwich, United Kingdom

[73] Assignee: Caterpillar Inc., Peoria, Ill.

[21] Appl. No.: 08/692,951

[22] Filed: Aug. 7, 1996

[30] Foreign Application Priority Data

Aug. 8, 1995 [DE] Germany ............... 195 29 104

[51] Int. Cl.$^6$ ..................................... F16H 7/24
[52] U.S. Cl. .................. 474/150; 474/171; 474/205; 474/901
[58] Field of Search ............... 474/901, 148, 474/150, 204, 205, 207, 237, 273, 249, 167, 171; 192/20, 21.5, 41 R, 70.11, 58.3, 85 F, 105 BB, 105 F

[56] References Cited

U.S. PATENT DOCUMENTS

| | | | |
|---|---|---|---|
| Re. 33,713 | 10/1991 | Watanabe et al. | 192/21.5 |
| 1,118,384 | 11/1914 | Thomson | 192/85 F |
| 1,858,514 | 5/1932 | Lell | 192/85 F |
| 1,953,964 | 4/1934 | Laskowitz | 74/84 R |
| 2,992,863 | 7/1961 | Fredricks et al. | 474/161 |
| 3,483,766 | 12/1969 | Erickson | 474/161 |
| 3,575,474 | 4/1971 | Russ, Sr. | 474/901 |
| 3,722,962 | 3/1973 | Cooper | 305/35 |
| 3,771,843 | 11/1973 | Clasper et al. | 305/21 |
| 3,870,379 | 3/1975 | Payne | 305/35 |
| 3,979,154 | 9/1976 | Groff | 305/21 |
| 4,102,292 | 7/1978 | Hunter et al. | 115/1 R |
| 4,128,022 | 12/1978 | Ritter | 74/694 |
| 4,218,932 | 8/1980 | McComber | 474/161 |
| 4,271,725 | 6/1981 | Takao et al. | 74/730 |
| 4,328,876 | 5/1982 | Horsch | 180/6.44 |
| 5,135,085 | 8/1992 | Kinoshita et al. | 192/41 R |
| 5,143,192 | 9/1992 | Vojecek et al. | 192/107 M |

FOREIGN PATENT DOCUMENTS

| | | |
|---|---|---|
| 0 165 245 | 7/1989 | European Pat. Off. . |
| 0 512 467 | 11/1992 | European Pat. Off. . |

*Primary Examiner*—Roger J. Schoeppel
*Attorney, Agent, or Firm*—Michael J. Striker

[57] ABSTRACT

A drive system for a "Caterpillar" vehicle has at least one elastic belt track which is driven by a drive gear in accordance with the principle of a frictional connection, and a further gear which is supported coaxially to the drive gear so that the drive force can be transferred to the coaxially supported gear and it is engaged with the belt track through toothed elements.

19 Claims, 2 Drawing Sheets

DRIVE SYSTEM FOR "CATERPILLAR" VEHICLE

BACKGROUND OF THE INVENTION

The present invention generally relates to a "CATERPILLAR" vehicle.

More particularly, it relates to a "CATERPILLAR" vehicle which has at least one endless, elastic belt track which is drivable by a drive gear, and the belt track, at least locally, has an inner surface with which it engages a substantially cylindrical peripheral surface of the drive gear.

In the "CATERPILLAR" vehicle its traveling mechanism is composed of an endless, elastic belt track which is drivable by a drive gear, and its drive force is transmitted through the frictional connection between the drive gear and the inner side of the endless, elastic belt track. Such "CATERPILLAR" vehicles are disclosed in several patents. As an example, European Patent Document EP 0 165 245 discloses one of such "CATERPILLAR" vehicles.

A specific problem of the drive system which transmits the drive force through the frictional connection between the drive gear and the belt track is that, under unfavorable conditions it is necessary to maintain the slippage as low as possible. In European Patent Document EP 0 165 245 sit has been proposed to limit the slippage potential by maintaining the corresponding quality of the inner side of the belt track. European Patent Document 0 512 467 proposes a special design of the outer peripheral surface of the drive gear to reduce the dirt and thereby the slippage potential between the drive gear and the belt track. The proposed means however can not guarantee reliable operation of the drive without slippage in all cases of applications of the "CATERPILLAR" vehicle. In order to reduce the slippage it is also possible to increase the tension of the belt track. However, an increased tension of the belt track has a disadvantage that it results in increased wear. It is further known to transfer the drive force by means of the toothed elements of the drive gear cooperating with the endless elastic belt track. An example of such solution is disclosed in U.S. Pat. No. 3,870,379. The disadvantage of such a toothed or form-locking force transmission is however that the belt track near the location at which the drive force is transmitted from the drive gear to the belt track is subjected to an excessive wear. The toothed means connected with the belt track rub on and off.

SUMMARY OF THE INVENTION

Accordingly, it is an object of the present invention to provide a drive system for a "CATERPILLAR" vehicle, which avoids the disadvantages of the prior art.

More particularly, it is an object of the present invention to provide a drive system for a "CATERPILLAR" vehicle in which the drive forces are transmitted in accordance with the principle of frictional connection, and the magnitude of the possible slippage is reduced without increasing the wear of the belt track.

In keeping with these objects and with others which will become apparent hereinafter, one feature of the present invention resides, briefly stated, in a drive system for a "CATERPILLAR" vehicle in which in the drive gear at least one freely rotating gear is supported coaxially to the drive gear, the driving of the drive gear is performed through this gear, and its outer peripheral surface is in engagement with force transmitting elements or guiding means mounted on or in the elastic belt track.

When the drive system for a "CATERPILLAR" vehicle is designed in accordance with the present invention, it eliminates the disadvantages of the prior art.

In the drive system in accordance with the present invention the drive force which acts on the drive gear is switched to the gear supported coaxially to the drive gear by means of known coupling devices, for example, a form-locking, friction, flow, free running, centrifugal force or lamellas coupling. The coupling in the event of occurrence of slippage between the drive gear and the elastic belt track can switch the force flow automatically to at least one coaxial gear. Further, it is proposed to remotely activate the coupling between the drive gear and at least one coaxial gear by electrical, hydraulic or other known control means.

In accordance with another feature of the present invention, in order to guarantee a reliable force transmission the coaxially supported gear has a set of outer teeth which engage into a complementary set of teeth provided on the inner side of the elastic belt track teeth. The teeth of the coaxially supported gear and the belt track can be composed of metal. However, they can be also composed of high strength, friction and wear optimized synthetic plastic materials or fiber compound materials.

The advantage of the proposed solution is that, under normal conditions of use, the drive force is transmitted only by the frictional connection between the drive gear and the belt track. Since the frictional connection drive can be designed only for normal and no longer for extreme conditions of use, it is possible to reduce the tension of the belt track which improves its surface life. The gear supported coaxially to the drive gear can be driven through the form-locking connection including toothed means relative to the belt track, and only small forces can be transmitted through the toothed means, which also has a positive effect on the service life of the belt track. When however, the conditions of use occur in which a slippage takes place, the drive force is transferred from the drive gear to the coaxial gear, which then transmits the drive forces to the belt track through the toothed means. Depending on the selection of the coupling and the switching speed, the occurrence of the slippage can be eliminated almost completely. This can be achieved without taking into consideration the disadvantages of the prior art which include the shortened surface life of the belt track and the toothed means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
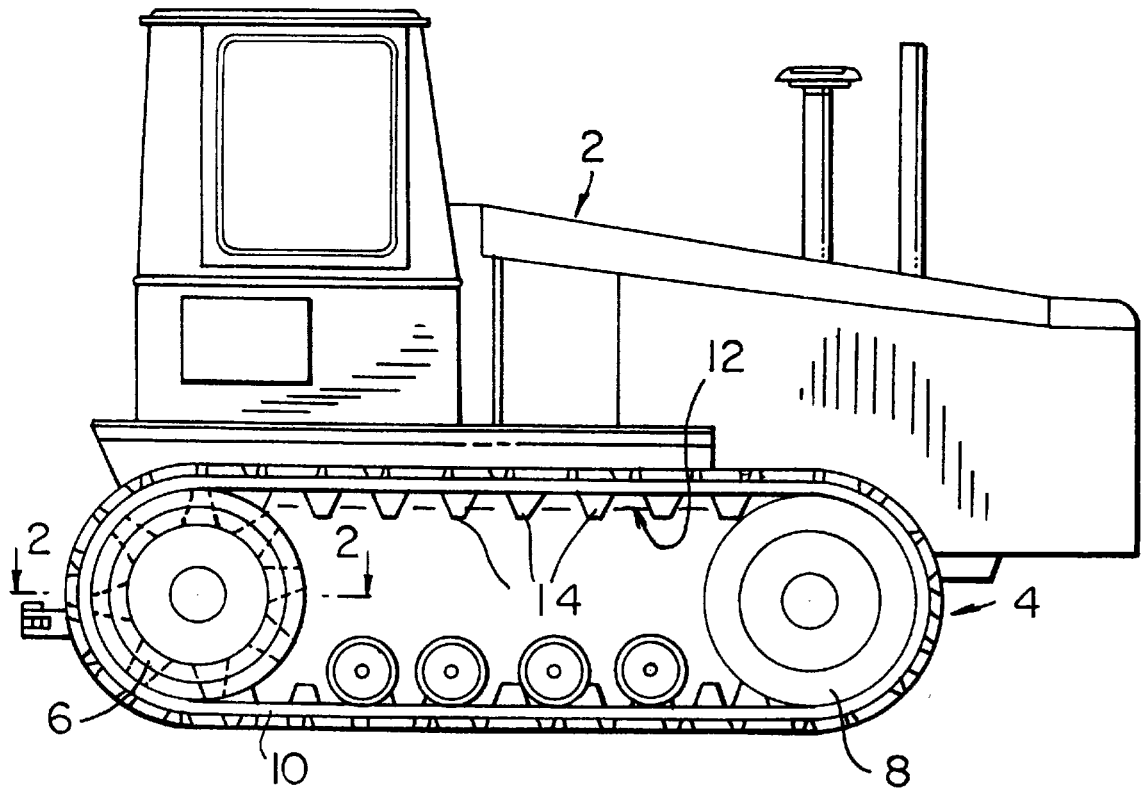
FIG. 1 is a view showing a "CATERPILLAR" vehicle with a drive system in accordance with the present invention.

A "CATERPILLAR" vehicle is shown in FIG. 1 and identified with reference numeral 2. It has a "CATERPILLAR" traveling mechanism 4 which includes at least one drive gear 6 and a deviating gear 8, as well as an endless elastic belt track 10. A guiding element 14 is arranged on the inner side 12 of the belt track 10. As a rule, it extends centrally during the traveling of the vehicle 2 through a gap in the drive gear and the deviating gear and, by contact to the side walls of the gap orients the belt track to a straight run around the drive gear and the deviating gear.

Figure 2:
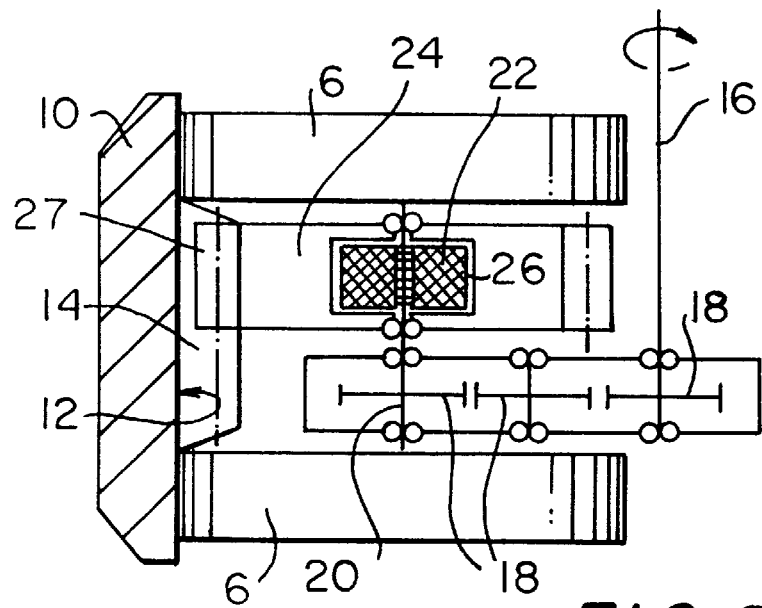
FIG. 2 is a view showing a cross-section of a drive gear along the line 2—2, with a coupling means provided for transmission of the drive force to a coaxially supported gear and formed as a magnetic powder coupling.

The driving system has a coupling device, and its first embodiment is shown in FIG. 2. In this embodiment the drive force is transmitted through a shaft 16 and toothed gears 18 to an axle 20 of the drive gear 6. The drive gear 6 is in a frictional connection with the belt track 10. The coil support 22 is connected fixedly for joint rotation with the axle 20. A gear 24 arranged coaxially to the drive gear 6 is supported rotatably on the axle 20. Magnetic powder is located in a gap 26 between the coil support 22 and a body of the coaxial gear 24. When the exciting coil in the coil support 22 is supplied with direct current by a commutator ring or by an inductive transmission and a rectifier, the magnetic powder under the action of the direct current excitation as result of the magnetizing is converted to a substantially solid body and connects the coil support 22 with the coaxial gear 24.

The switching of the exciting coil can be performed by a not shown but well known evaluating and control device which determines the occurring slippage and supplies control signals to the exciting coil. In a field 27, the outer toothed elements of the coaxial gear 24 engage with the guiding element 14 of the elastic belt track 10 and transmit in this manner the drive force to the elastic belt track 10. It is to be understood that in this described coupling means as well as in other coupling means, instead of the guiding element 14 also other force transmitting means can be used which are generally known from the prior art, for toothed connection of the coaxial gear 24 with the elastic belt track 10.

Figure 3:
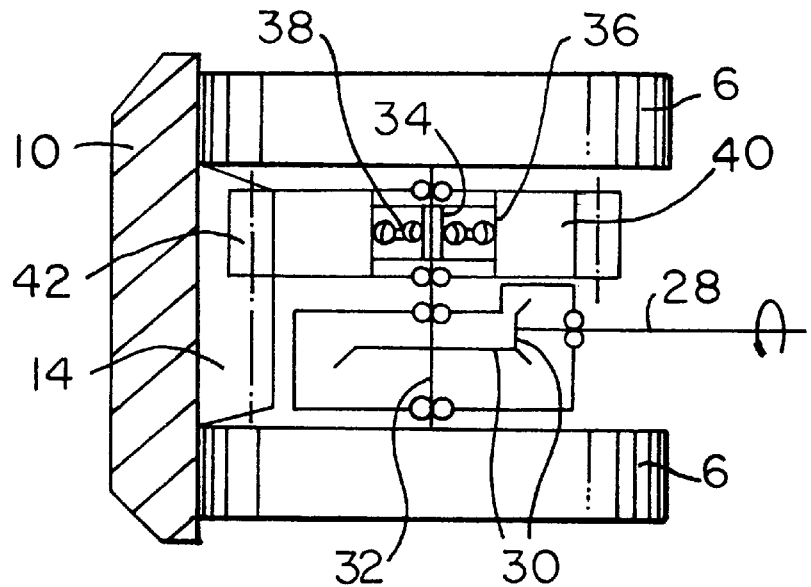
FIG. 3 is a view showing a cross-section of the drive gear along the line 2—2 in FIG. 1, with a coupling means provided for transmission of the drive force to the coaxially supported gear and formed as a free running coupling.

FIG. 3 discloses an embodiment of a coupling device which includes a free running coupling. The drive force is transmitted from the drive shaft 18 through the bevel-toothed gears 30 to the axle 32 of the drive gear 6. An inner ring 34 is connected for joint rotation with the axle 32 which drives in rotation an outer ring 36 rotatably connected with the axle 32 and non-rotatably connected with the coaxial gear 40. This driving is performed through the clamping action of the clamping body 38, and thereby the drive force is transmitted from the axle 32 to the coaxial gear 40. The coaxial gear 40 transmits also the drive force in the field 42, in which the outer toothed means of the coaxial gear 40 is in engagement with the guiding element 14 of the elastic belt track 10.

Figure 4:
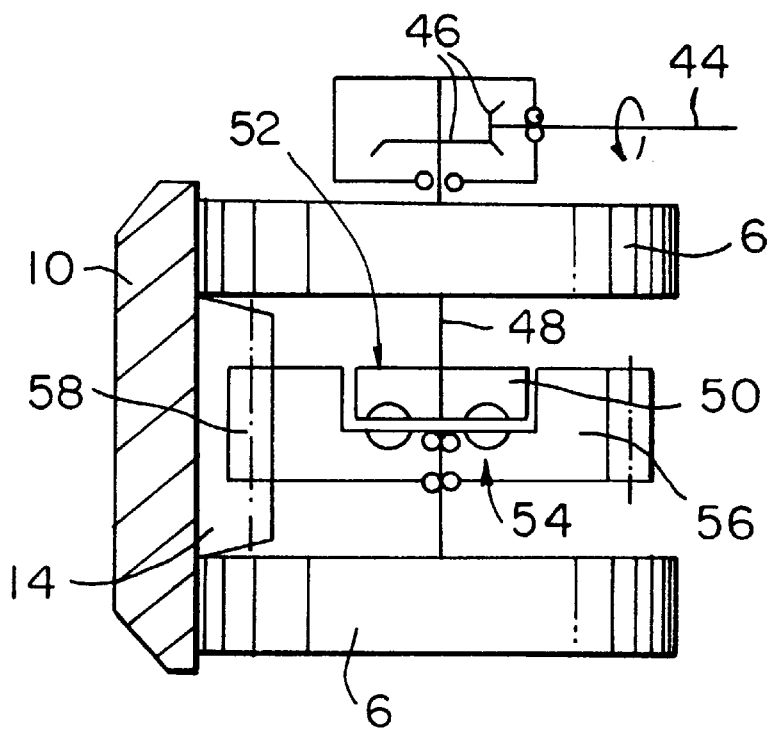
FIG. 4 is a view showing a cross-section through the drive gear taken along the line 2—2 in FIG. 1, with a coupling means provided for transmission of the drive force to the coaxially supported gear and formed as a flow coupling.

In an embodiment shown in FIG. 4 the drive force is transmitted from the drive shaft 44 through the bevel-toothed gears 46 to an axle 48 of the drive gear 6. A pump gear 50 of a flow coupling 52 is connected with the axle 48 for joint rotation. A turbine gear 54 is connected with the coaxial gear 56 for joint rotation. When the pump gear 50 is rotated, or in other words when the slippage occurs, the ribs of the pump gear 50 build up a pressure which acts on the ribs of the turbine gear 54 and thereby engage it in rotation. With this effect, the drive force is transmitted from the axle 48 to the coaxial gear 56. The toothed elements of the coaxial gear 56 are in engagement with the guiding element 14 of the elastic belt track 10 in a field 58 and transmit the drive forces to the belt track 10.

It will be understood that each of the elements described above, or two or more together, may also find a useful application in other types of constructions differing from the types described above.

While the invention has been illustrated and described as embodied in drive system for "CATERPILLAR" vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive system for a vehicle, comprising at least one endless elastic belt track; a drive gear engageable with said belt track through a frictional connection and thereby driving said belt track; at least one additional gear engageable with said belt track through a form-locking connection; and means for connecting said drive gear with said additional gear so that when said frictional connection is provided between said drive gear and said belt track said additional gear is not connected with said drive gear, but when a slippage occurs between said drive gear and said belt track a drive force is transmitted from said drive gear to said additional gear which then transmits the drive force to said belt track through said form-locking connection.

2. A drive system for a vehicle, comprising a drive gear having a substantially cylindrical peripheral surface; at least one endless elastic belt track having at least locally a flat inner surface which engages with said substantially cylindrical peripheral surface of said drive gear with a frictional connection between said flat inner surface of said belt track and said substantially cylindrical peripheral surface of said drive gear: at least one additional freely rotatable gear supported coaxially to said drive gear and engaging with said belt track through a form-locking connection; and means for connecting said drive gear with said additional gear so that when said frictional connection is provided between said drive gear and said belt track said additional gear is not connected with said drive gear, but when a slippage occurs between said drive gear and said belt track a drive force is transmitted from said drive gear to said additional gear which then transmits the drive force to said belt track through said form-locking connection.

3. A drive system as defined in claim 2, wherein said form-locking a connection includes means mounted in said elastic belt track.

4. A drive system as defined in claim 2, wherein said form-locking connection includes force transmitting elements.

5. A drive system as defined in claim 2, wherein said form-locking connection includes guiding means.

6. A drive system as defined in claim 2, wherein said means for connecting said drive gear and additional gear include a coupling which transmits a drive force acting on said drive gear to said additional gear.

7. A drive system as defined in claim 6, wherein said coupling is formed as a form-locking coupling.

8. A drive system as defined in claim 6, wherein said coupling is formed as a friction coupling.

9. A drive system as defined in claim 6, wherein said coupling is formed as a flow coupling.

10. A drive system as defined in claim 6, wherein said coupling is formed as a free running coupling.

11. A drive system as defined in claim 6, wherein said coupling is formed as a centrifugal coupling.

12. A drive system as defined in claim 6, wherein said coupling is formed as a lamellas coupling.

13. A drive system as defined in claim 6; and further comprising control means which remotely controls said coupling.

14. A drive system as defined in claim 13, wherein said control means is formed as electrical control means.

15. A drive system as defined in claim 13, wherein said control means is formed as hydraulic control means.

16. A drive system as defined in claim 2, wherein said elastic belt track has an inner side provided with teeth, said additional gear having outer teeth engaging with teeth of an inner side of said elastic belt track and forming said form-locking connection.

17. A drive system as defined in claim 16, wherein said additional gear and said teeth on said inner side of said elastic belt track are composed of metal.

18. A drive system as defined in claim 16, wherein said additional gear and said teeth on said inner side of said elastic belt track are composed of high-strength, friction and wear optimized synthetic plastic material.

19. A drive system as defined in claim 16, wherein said additional gear and said teeth on said inner side of said elastic belt track are composed of high-strength, friction, and wear optimized fiber compound material.

* * * * *